J. LENNERTON.
MACHINES FOR MAKING WEDGES.
No. 178,067. Patented May 30, 1876.
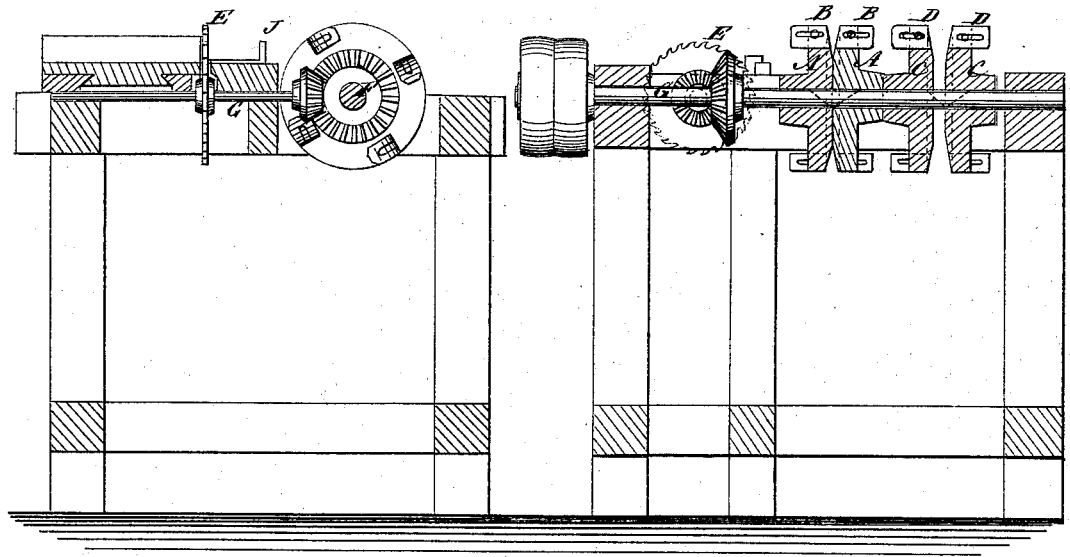
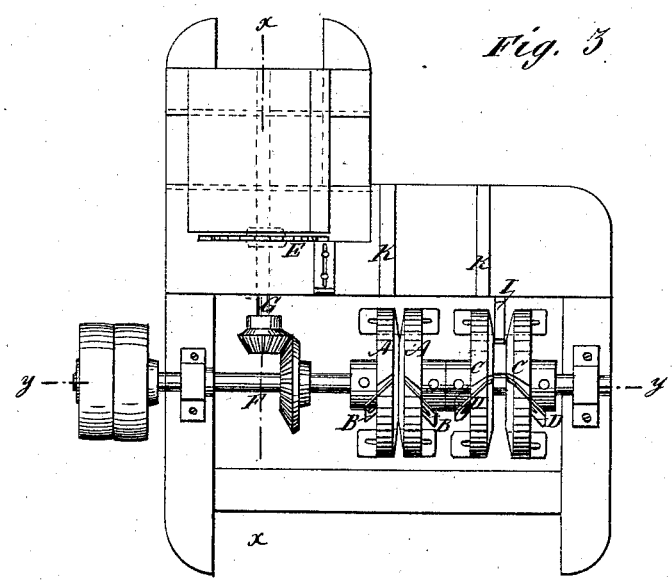
WITNESSES:
C. Neveux
John Goethals
INVENTOR:
J. Lennerton
BY
ATTORNEYS.

UNITED STATES PATENT OFFICE.

JOHN LENNERTON, OF TRURO, NOVA SCOTIA.

IMPROVEMENT IN MACHINES FOR MAKING WEDGES.

Specification forming part of Letters Patent No. 178,067, dated May 30, 1876; application filed March 25, 1876.

*To all whom it may concern:*

Be it known that I, JOHN LENNERTON, of Truro, Nova Scotia, have invented an Improvement in Machines for Making Wedges, of which the following is a specification:

The first part of my invention consists of two revolving cylinders fixed upon a shaft furnished with four cutters in each cylinder, so arranged as to cut the wedges to the required thickness and taper.

The second part of my invention consists of two other revolving cylinders, similar to the first pair, so arranged upon the same shaft as to cut the wedge to the required width.

The third part of my invention consists of a circular saw and movable table-top, so combined and arranged as to cut the wedge to the required length, and working in conjunction with the other parts.

Figure 1 is a sectional elevation of my improved machine, taken on the line $x\,x$ of Fig. 3. Fig. 2 is a sectional elevation on line $y\,y$, Fig. 3; and Fig. 3 is a top view.

Similar letters of reference indicate corresponding parts.

A represents the cylinders, with cutters B, for dressing the wedges to the required taper and thickness. C represents the cylinders, with cutters D, for dressing them to the required width; and E represents the saw for cutting them to the required length. The cylinders A and C are arranged on the same shaft F, side by side, and the saw is arranged on shaft G at right angles to A, and geared with it. The cutter-cylinders are arranged in pairs, with the adjacent sides beveled to correspond with the taper required, and the cutters are in the form of planing-tools set in said beveled sides, so that both sides of the blank are dressed to the required shape between the pairs of cylinders, and the width and thickness are determined by the distance the blanks go between them, the distance being regulated in one case by the stop-gage L, and in the other by the bottom or apex of the angle of the two cylinders, which touch each other at a distance from the periphery equal to the length of the required taper of the wedges. The gage J at the saw regulates the length of the wedges, and the guides K at the cutters direct the stuff to the cutters in the right line or angle.

Having thus described my invention, what I claim as new, and desire to secure by Letters Patent, is—

The combination of the cylinders A and cutters B for making the taper and thickness, cylinders C and cutters D for making the width, and the saw E for cutting off, substantially as specified.

JOHN LENNERTON.

Witnesses:
JOHN J. MCCABE,
GEO. M. F. CAMPBELL.